INVENTOR
TWEN S. WANG
BY H. S. Grover
ATTORNEY

INVENTOR
TWEN S. WANG
BY H. S. Grover
ATTORNEY

Patented June 20, 1950

2,511,948

UNITED STATES PATENT OFFICE 2,511,948

HYBRID CIRCUIT

Twen S. Wang, New York, N. Y., assignor to Radio Corporation of America, a corporation of Delaware Application March 19, 1946, Serial No. 655,558

2 Claims. (Cl. 179—170)

The present invention relates to a circuit arrangement for coupling between a two wire line and a four wire line such as is used in telephone or other audio circuits whereby a subscriber's telephone line may be coupled to a radio transmitter and a receiver.

An object of the present invention is to provide an improved hybrid circuit.

Another object of the present invention is the provision of a hybrid circuit in which the balance is not affected by the variation in resistance of the transmitting and receiving lines.

Another object of the present invention is the provision of a hybrid circuit which is less affected by the variation of resistance of the common phone line than has been the case in the heretofore known hybrid circuits.

Still another object of the present invention is the provision of a hybrid circuit in which the balance is good over a wide band of frequencies.

Still a further object of the present invention is the provision of a hybrid circuit which inherently provides amplification in the transmitting and receiving circuits.

The foregoing objects and others which may appear from the following detailed description are attained by providing a plurality of one-way amplifiers; one between the receiving circuit and the common phone line, another between the phone line and transmitting circuit and a third amplifier between the receiving and transmitting circuits so arranged as to balance out energy which normally would be coupled from the receiving circuit to the transmitting circuit.

The present invention will be more fully understood by reference to the following detailed description which is accompanied by a drawing in which:

Figure 1 illustrates in block diagram form an embodiment of the present invention, while

Figure 3 illustrates a modification of the form of invention shown in Figure 2 wherein the number of vacuum tubes used is reduced, while

Figure 1:
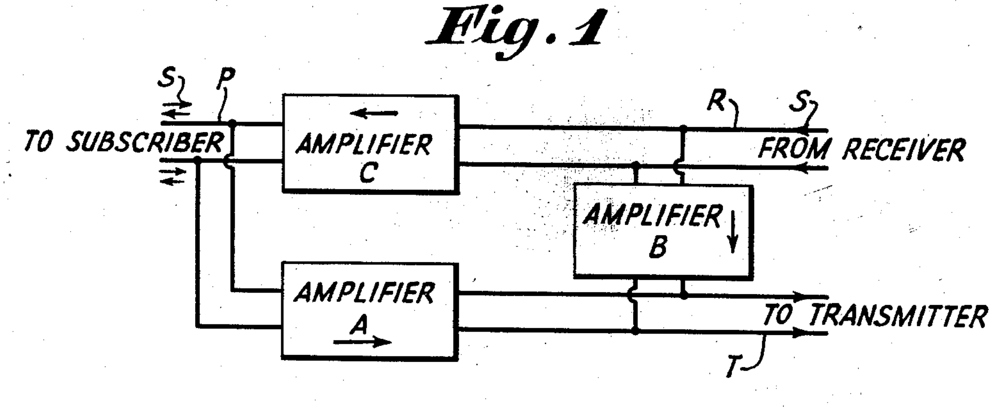

Referring now to Figure 1, there is shown a two-wire transmission line P in which signals are transmitted in both directions as is common in conventional subscribers telephone circuits. A two-wire transmission line R and a two-wire transmission line T are connected to a radio receiver and transmitter respectively.

Now, it is desired to couple the two-wire transmission lines R and T into the two-wire, two way transmission line P so that the received signal from receiving line R can only be transmitted to the common line. None of the received signal should be coupled to the transmission line T nor should the transmitted signal going out along line T be also coupled to the receiving line R. Fundamentally, these results are attained by connecting an amplifier C between incoming transmission line R and the common two-way line P. C amplifies only in the direction from line R to line P. Signals appearing at the amplifier C from the common phone line P are not repeated to the receiving transmission line R.

A second amplifier A couples between the common line P and the transmitter line T and amplifies only in the direction from P to T.

It is apparent that the arrangement as so far described could repeat signals from the two-way transmission line P directly into outgoing line T, thus transmitting the signal received from the transmitter. This is overcome by connecting a third amplifier B between transmission lines R and T in such manner that signals appearing at an input of amplifier B from transmission line R are amplified and introduced directly into the transmitting line T but in an opposing phase relationship to those appearing in line T from incoming line R through amplifiers C and A. If these two signals appearing in transmission line T are in the magnitude and in phase opposing relationship, they cancel each other and leave no resultant signal in the outgoing transmission line T. The relative directions of transmission of the signals through the amplifiers and along the transmission line are indicated by arrows S in Figure 1.

Figure 2:
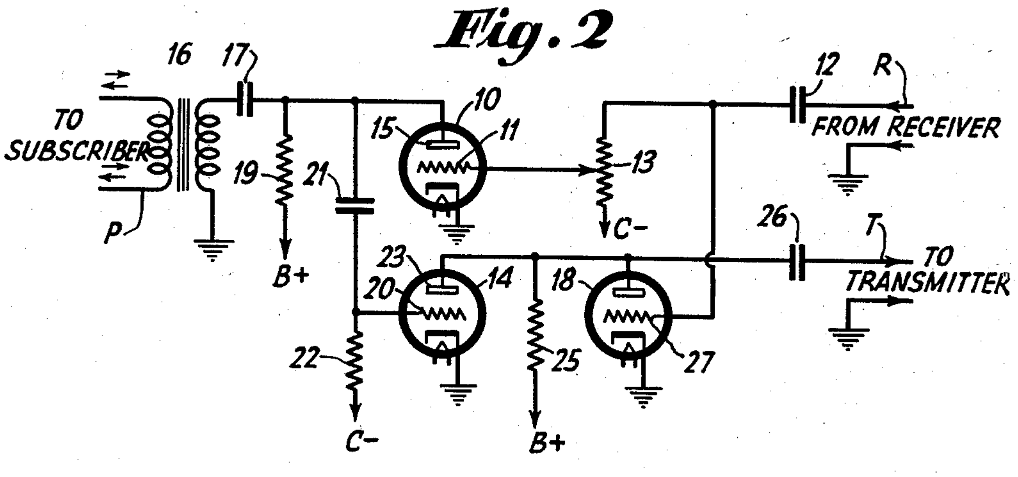
Figure 2 illustrates schematically the circuit diagram employed in the modification arrangement of Figure 1.

Figure 2 shows in more detail an actual circuit arrangement which may be employed in the amplifier arrangement of Figure 1. In this figure there are shown three triode amplifier tubes 10, 14 and 18. While I have mentioned the tubes as being triodes, it is within the scope of the present invention to use multigrid tubes such as tetrodes, pentodes, beam power tubes, etc. Control grid 11 of tube 10 is coupled to the receiving transmission line through the intermediary of coupling condenser 12. The connection from grid 11 is connected to a variable tapping point along potentiometer 13 whereby any desired portion of the signal on incoming transmission line R may be applied to the grid 11. Plate 15 of tube 10 is coupled to the common phone line P through the coupling transformer 16 and coupling condenser 17. The source of anode potential is connected to the plate 15 through plate load resistor 19.

Tube 14 which couples from the common phone line P to the outgoing transmission line T has its grid 20 coupled to one winding of transformer 16 through coupling condenser 21. A suitable grid biasing potential may be applied to grid 20 through grid leak resistor 22 from a source of C— biasing potential (not shown). The plate 23 of tube 14 and plate 24 of tube 18 are connected together and to a source of B potential through a common plate load resistor 25. These plates are coupled to the transmission line T through coupling condenser 26. Grid 27 of tube 18 is connected to coupling condenser 12 whereby energy from the receiving line R is applied to the control grid 27. It will be seen that tube 10 corresponds to amplifier C of Figure 1. Tube 14 corresponds to amplifier A of Figure 1 while tube 18 corresponds to amplifier B of Figure 1. The theory of operation of Figure 2 is the same as that of the block diagram of Figure 1 and will therefore not be repeated.

Figure 3:
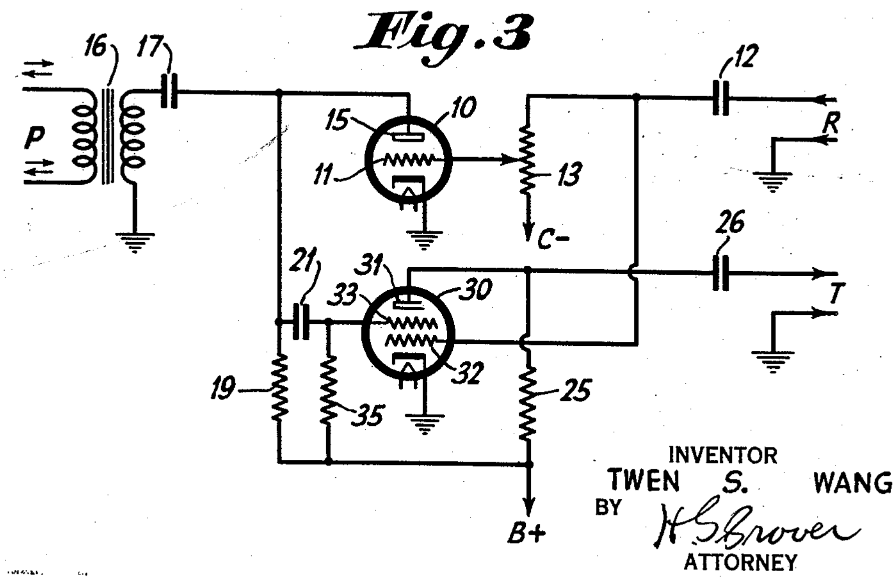

The modified arrangement shown in Figure 3 has tube 10 connected between receiving line and the common phone line P is exactly the same way as Figure 2 so that it will not again be described. However, a tetrode tube 30 is substituted in Figure 3 for tubes 14 and 18 of Figure 1. Plate 31 of tube 30 is applied with anode potential through load resistor 25 as before and the signals appearing across resistor 25 are coupled to the outcoming transmission line T through coupling capacitor 26 as before. However, the first grid 32 is coupled to the receiving line R while the second grid 33 is coupled to the common phone line P through coupling capacitor 21. The appropriate positive potential for proper operation of tube 30 is applied to second grid 33 through dropping resistor 35 connected to the source of anode potential. Now, tube 30 acts as an amplifier between the common phone circuit P and the transmitter line T due to signals from P being impressed on the second grid 33 and influencing the electron stream within the tube. The counterphase signal used to neutralize the coupling between lines R and T is applied to the first grid 32 and effectively neutralizes any signals from transmission line R which are impressed on grid 33 from transmission line P.

Figure 4:
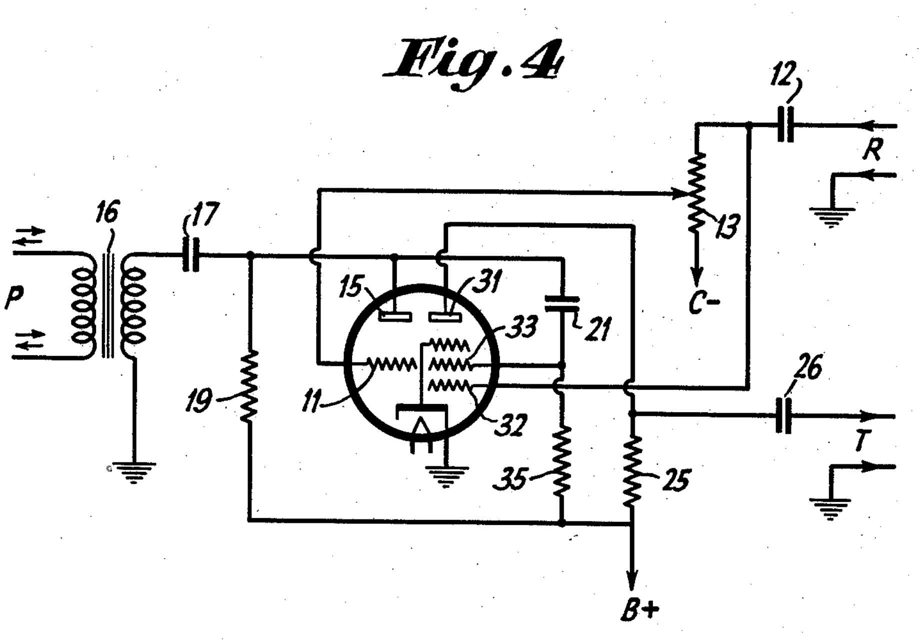
Figures 4 and 5 illustrate further modifications using only a single vacuum tube to perform all of the amplifying features of the present invention.

The further modification shown in Figure 4 utilizes a single vacuum tube which may be a triode-pentode of the type commonly known as 6F7. That is, a single glass envelope contains a complete triode amplifier and a pentode amplifier both operating from a common cathode. Otherwise, the connections in Figure 4 are the same as in Figure 3 and will not be again described. The same reference numerals apply in both figures.

Figure 5:
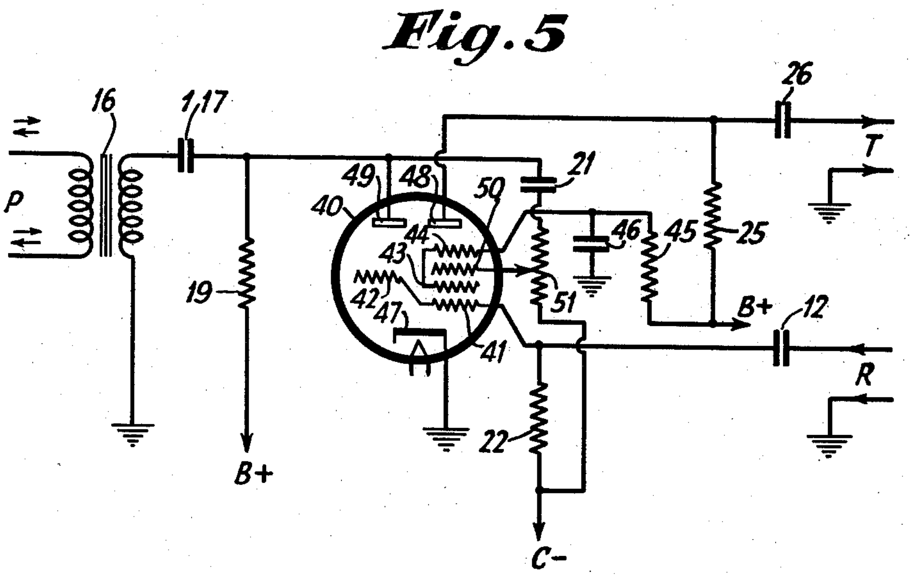

A further modification shown in Figure 5 utilizes a triode-hexode such as type 6K8 tube rather than the 6F7 of Figure 4. In the triode-hexode 40, the first grid 41 of the hexode portion is directly connected to the control grid 42 of the triode portion within the tube. Grids 43 and 44 in the hexode portion of the tube are connected together within the tube and are applied with an appropriate positive potential from the source of anode potential through dropping resistor 45. Grids 44 and 43 are by-passed to a point of zero reference potential such as ground by the by-pass condenser 46. In this circuit arrangement the incoming signal from transmission line R is applied to control grids 42 and 41 through coupling condenser 12, thus influencing the streams of electrons from cathode 47 to anodes 48 and 49 simultaneously. The signal appearing on plate 49 is coupled to the two-way phone line through the coupling capacitor 17 and transformer 16. Signals arriving at the hybrid circuit from phone line P are coupled to grid 50 of the hexode portion of the tube through coupling capacitor 21 and potentiometer 51. It will be seen that any signals on line P from transmission line R affect the electron stream in the hexode portion of the tube in such manner as to neutralize one another. Thus, the only signal transmitted through the arrangement from line P to line T is one which originates in line P alone and which does not also appear in line R.

While I have illustrated a particular embodiment of the present invention, it should be clearly understood that it is not limited thereto since many modifications may be made in the several elements employed and in their arrangement and it is therefore contemplated by the appended claims to cover any such modifications as fall within the spirit and scope of the invention.

What is claimed is:

1. A circuit arrangement for coupling an incoming line and an outgoing line to a two-way line including an electron discharge structure providing a pair of electron discharge paths and comprising a cathode electrode common to said discharge paths, a control electrode common to said discharge paths, a further control electrode interposed in one of said discharge paths, and anode electrodes for each of said discharge paths, means coupling said control electrode common to said discharge paths to said incoming line, means coupling the anode electrode associated with the discharge path having only the common control electrode therein to said two-way line, means coupling said two-way line to said further control electrode interposed in said one of said discharge paths, and means coupling the anode electrode associated with said one discharge path to said outgoing line.

2. A circuit arrangement for coupling an incoming line and an outgoing line to a two-way line including an electron discharge structure providing a pair of electron discharge paths and comprising a cathode common to said discharge paths, control electrodes for each of said discharge paths, a further control electrode interposed in one of said discharge paths, and anode electrodes for each of said discharge paths, means coupling said control electrodes of each of said discharge paths to said incoming line, means coupling the anode electrode associated with the discharge path having only the control electrode therein to said two-way line, means coupling said two-way line to said further control electrode interposed in said one of said discharge paths, and means coupling the anode electrode associated with said one discharge path to said outgoing line.

TWEN S. WANG.

REFERENCES CITED

The following references are of record in the file of this patent:

UNITED STATES PATENTS

| Number | Name | Date |
|---|---|---|
| 1,992,833 | Murphy | Feb. 26, 1935 |
| 2,280,158 | Mitchell | Apr. 21, 1942 |
| 2,319,717 | Bjornson | May 18, 1943 |

FOREIGN PATENTS

| Number | Country | Date |
|---|---|---|
| 279,415 | Italy | Nov. 12, 1930 |